May 31, 1938.  W. B. FAGEOL  2,118,811
DRIVING MECHANISM
Filed April 9, 1935  7 Sheets-Sheet 1

Inventor
William B. Fageol

By Strauch & Hoffman
Attorneys

May 31, 1938.  W. B. FAGEOL  2,118,811
DRIVING MECHANISM
Filed April 9, 1935  7 Sheets-Sheet 5

Inventor
William B. Fageol
By
Strauch + Hoffman
Attorneys

Patented May 31, 1938

2,118,811

UNITED STATES PATENT OFFICE 2,118,811

DRIVING MECHANISM

William B. Fageol, Kent, Ohio, assignor to Twin Coach Company, Kent, Ohio, a corporation of Delaware Application April 9, 1935, Serial No. 15,488

8 Claims. (Cl. 180—54)

My present invention relates to a driving mechanism for motor vehicles, and more particularly to a novel power and drive mechanism for driving the wheels of the motor bus from an engine located substantially vertically above said wheels. The novel drive means disclosed herein are particularly adapted for use in conjunction with the low floor rear drive vehicle disclosed in my copending patent application Serial No. 15,085 filed April 6, 1935.

It is a primary object of the invention disclosed herein to provide a novel vehicle driving mechanism embodying a transmission positioned above the vehicle wheels and a substantially vertical drive shaft interconnecting the transmission and the vehicle drive mechanism.

Still another object of the present invention is to locate the driving motor in a novel manner above the driving axle in a vehicle and to provide a novel driving connection between the power transmission means associated with the motor and the rear axle.

It is still another object of the present invention to provide, in a vehicle, a novel arrangement for transmitting driving power from an engine mounted on the vehicle to a drive axle and in which maximum angularity of the driving connection is insured by the arrangement of the spring connections to the vehicle and to the drive axle.

It is still another object of the present invention to provide a flexible and extensible drive connection between a drive axle which spring supports the vehicle and a motor located thereabove.

Still another object of the present invention is to provide in a vehicle driving mechanism, a novel means for driving the transmission power take-off shaft which permits relatively free longitudinal movement of said shaft while at the same time relieving the driving means of side thrust.

A still further object of the present invention is to provide a novel change speed transmission mechanism of compact form.

Another object of the present invention is to provide a novel power and drive mechanism for a vehicle in which the vehicle driving motor is located substantially vertically above the vehicle driving wheels and in which power is transmitted to the driving wheels from a differential mechanism associated with the motor by means of flexible driving connections.

Further objects of the invention will appear from the following description and appended claims when taken in connection with the accompanying drawings wherein:

Referring to the drawings in detail in which like reference numerals designate similar parts throughout the several views, reference numeral 10 (Figure 1) denotes generally the body and framing of a motor vehicle such as that disclosed in my copending application Serial No. 15,085 referred to above. The frame 10 which forms the support for the motor 12 includes motor supporting members 14 and 15 located transversely of the vehicle and longitudinal members 16 and 17. Each of the vehicle springs 18 which support the vehicle frame on the driving axle 19 are pivotally secured to the vehicle at their front ends by means of inverted U-shaped brackets 20 which are secured to the underside of the frame member 21. The projecting portion of each member 16 and 17 forms a support for the other end of the springs 18 and for this purpose the projecting portions are provided with brackets 22 in which one end of a spring shackle 23 is pivoted. One of the springs 18 is pivotally secured to the other end of each shackle. The driving axle 19 may be of usual construction and is provided with a differential mechanism 24 between the springs 18. The members 16 and 17 are secured to the member 14 and to the transverse framing member 21, the latter being carried by brackets secured in a suitable manner to the side frame members 25 of the body base or sub-frame.

The motor 12 and the housing 28 (Figure 3) which houses the transmission mechanism 29 and the clutch 30 are positioned transversely of the vehicle above the rear drive axle 19. The flange 31 of the casing 28 is adapted to be connected to the crank case of the engine 12 whereby the engine, the clutch and the transmission mechanism comprise a unitary structure. The engine is provided with brackets 32 which are connected to upstanding supports 33 on the transverse members 14 and 15.

Figure 3:
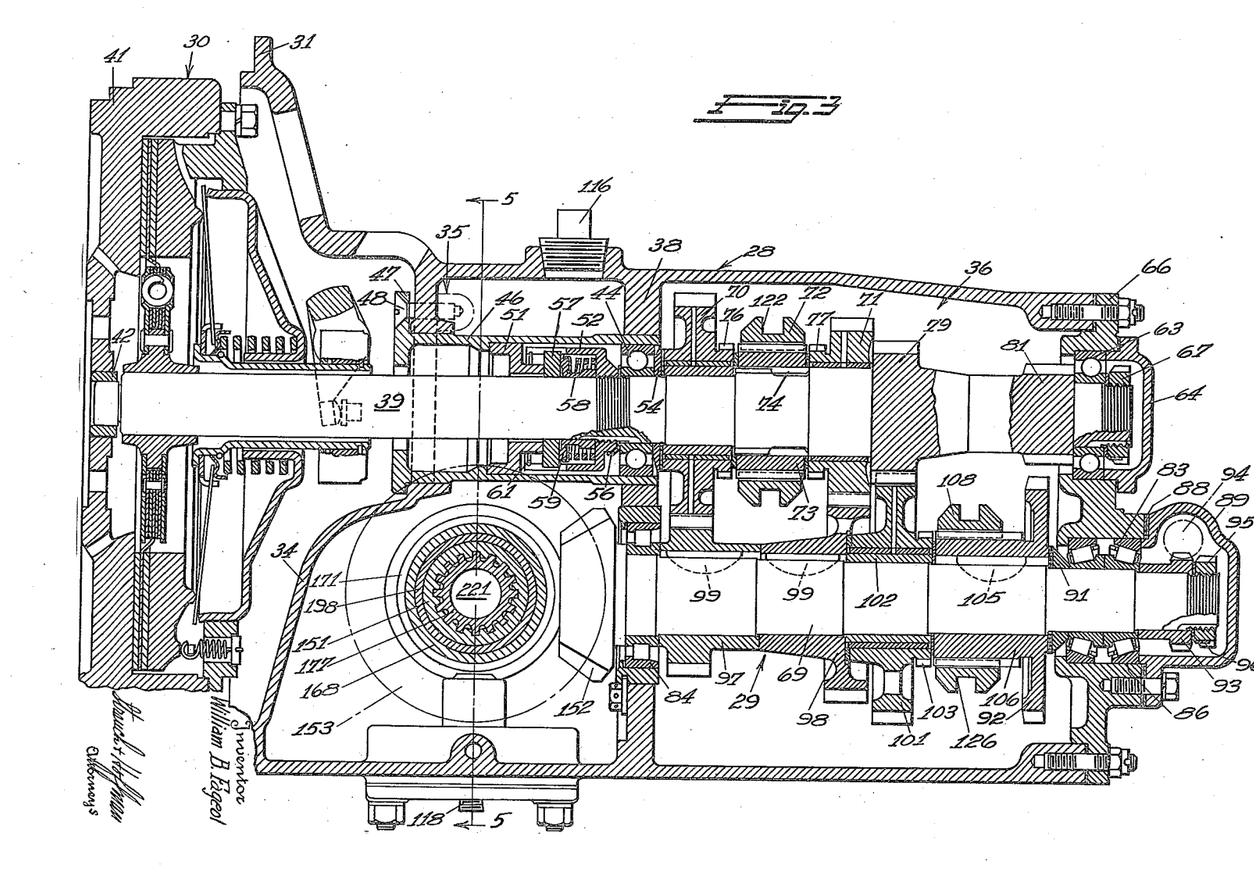
Figure 3 is a transverse horizontal section of the transmission and drive used in the vehicle of Figure 1.

Referring to Figure 3 which shows the details of the interior of the casing 28, a wall 34 in the end of the casing adjacent the clutch 30 separates the interior of the casing from the clutch and the crank case of the engine 12, and the casing is divided into two parts or sections 35 and 36 by a partition wall 38. The section or compartment 36 contains the change speed transmission and section 35 is devoted to housing the extensible final drive connection later to be described.

The engine crank shaft is connected through the clutch 30 which may be of conventional form to the shaft 39 of the change speed transmission mechanism 29. The shaft 39 is piloted at one end in the center of vehicle flywheel 41 in the manner indicated by reference character 42. Shaft 39 is rotatably carried in a bearing 44. The outer race of the bearing 44 is carried by a hollow cylindrical member 46. This cylindrical member, provided with a flange 47, is inserted in aligned openings in the walls 34 and 38 and is secured in place by means of studs 48 passing through suitably spaced apertures in the flange 47. The cylindrical member 46, in addition to providing a seat for the bearing 44, contains a sealing assembly or gland comprising an annular stationary member 51 and an annular member 52, which is secured on a threaded portion of the shaft 39 in abutment with the inner race member of the bearing 44, which in turn abuts a stop ring or washer 54. When the member 52 is properly located by turning it upon shaft 39 it is secured against movement by means of a locking ring 56 provided with tongues engaging in the keyway in the shaft and a notch in the top of the annular member 52. A packing member 57 is pressed against the end of the member 51 by means of a spring 58 which presses the annular flange of the packing member 59 against the member 57. The snap ring 61 prevents total disassembly of the parts when the pressure of the end of the annular member against the packing member 57 is removed.

The end of the shaft 39 opposite the clutch 30 is rotatably carried by a bearing 63 supported in a bearing carrier 64 secured in an aperture in the cover member 66. Locking means indicated generally by the reference character 67 are provided for holding the bearing in place and the bearing carrier is provided with an annular flange which is secured against the cover plate 66. The counter-shaft 69 of the change speed transmission 29 is driven from the main shaft 39 at selectable relative speeds through a series of gears and clutching devices. Gears 70 and 71 are journaled for rotation upon the shaft 39 and are adapted to be clutched to the shaft by an internally splined clutch member 72 which is slidable on the externally splined sleeve 73, the latter being secured by a key 74 or any other suitable means so that it is compelled to rotate with the shaft 39. The hub of each gear 70 and 71 is provided with clutch teeth 76 and 77 whereby either of these gears may be secured to the shaft 39 for rotation therewith by moving the clutch member 72 axially of the externally splined sleeve 73. Pinions 79 and 81 are formed on or secured to the shaft 39.

The counter-shaft 69 is journaled in the wall 38 and the cover plate 66 by bearings 83 and 84. The bearing 83 is a combined radial and anti-frictional bearing, the outer race members of which are carried in a recess 86 formed in the cover member 66. The axial spacing of the outer bearing race members may be varied by moving or increasing the number of shims 88 under the flange of the cap member or housing 89 for the speedometer drive. The inner race members for the bearings 83 are in abutment with each other and are positioned axially on the shaft 69 by contacting one of the inner race members with a spacing collar 91, the position of which is variable by removing or replacing shims between said spacing collar and the end of gear 92 which is keyed or otherwise secured upon the shaft 69. The inner race members are pressed against each other and the spacing collar 91 by the hub of the speedometer drive gear 93, which is retained in position on the shaft 69 by means of a nut 95 and a locking device 96.

Gears 97 and 98 are secured for rotation with the shaft 69 by means of keys 99 and are constantly in mesh with gears 70 and 71 respectively on the shaft 39. A third gear 101 is rotatably journaled on the bearing bushing or sleeve 102 on the counter-shaft 69. This gear is provided with clutch teeth 103 on an axial extension of its hub.

Previously mentioned gear 92 is keyed by means of a key 105 or otherwise secured for rotation with the shaft and is provided with an axially extending splined hub 106 upon which the internally splined dog clutch member 108 is slidably mounted. It will be noted that the teeth of the pinion 81 and the gear 92 are chamfered so that a suitable idler gear 110 (Figure 6) may be engaged with the gear and pinion when it is desired to reverse the direction of rotation of the shaft 69.

Figure 6:
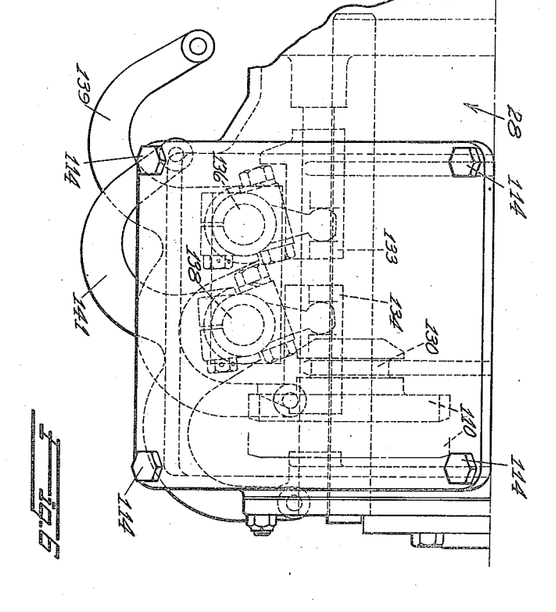
Figure 6 is a fragmentary view in plan of a part of the transmission illustrated in Figure 3.

The gear 93 drives the speedometer drive shaft 94 which is suitably journaled in the casing 89. Also as shown in Figure 6, access to the casing 28 may be had by removing a rectangular cover plate which is secured to the edge of a rectangular opening in the casing by means of bolts 114. Lubricant is introduced into the casing 28 through an opening closed by a filler plug 116 and the casing may be drained when desired through an opening closed by the plug 118.

Figure 4:
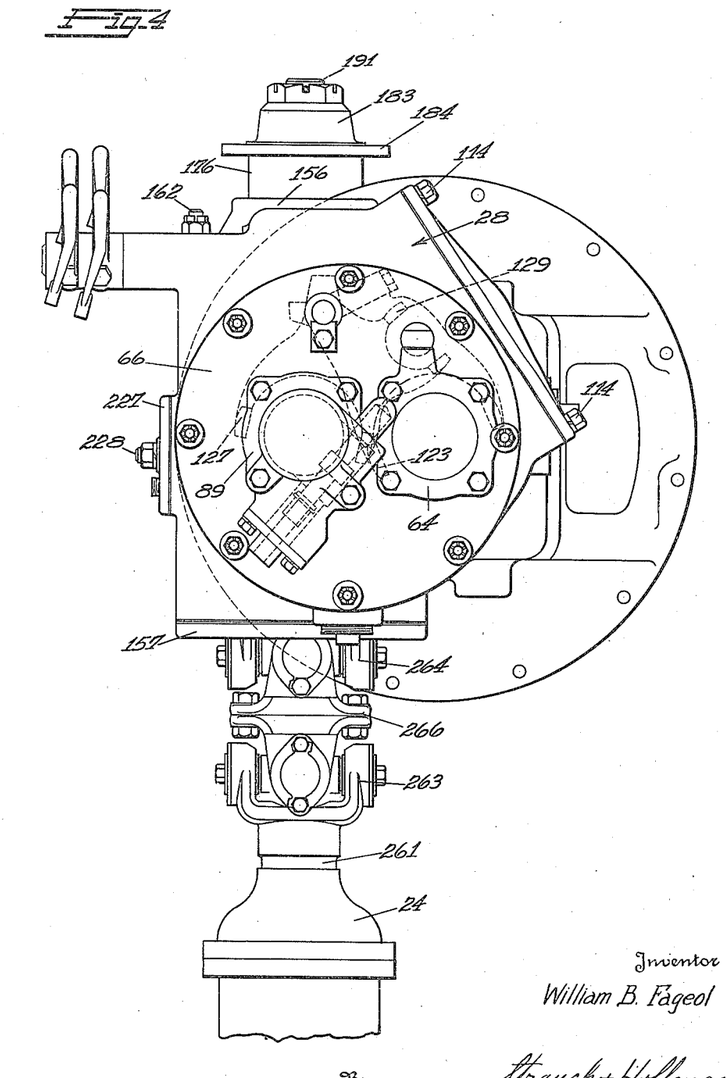
Figure 4 is a view in elevation of the transmission shown in Figure 3 as seen from the right.

The clutch sliding member 72 includes a groove 122 engaged by a shifter fork 123 (Figure 4). The clutch member 108 is likewise grooved as indicated by reference character 126, said groove cooperating with a shifter fork 127 (Figure 4). The previously mentioned idler gear 110 is operated by a shifter fork 129 (Figure 4) engaged in a groove 130 in its hub.

The shifter fork operators 133 and 134 are carried upon vertically disposed shafts 136 and 138 respectively which are under the control of branch arms 139 and 141. These arms may be operated by means of cables or rods in the manner disclosed in my previously mentioned copending application, Serial Number 15,085 filed herewith on April 6, 1935.

In operation of the change speed mechanism just described high speed drive of the shaft 69 is obtained by shifting the dog clutch member 72 to the left by means of the shifter fork 123 so that the clutch teeth 76 are engaged by the internal spline of the dog clutch member. The sleeve 73 and the gear 70 will now rotate together driving the gear 97 which is secured to the shaft 69. It will be understood that when the clutch member 72 is moved to the left the clutch member 108 is in the position shown in Figure 3, and the gears 81 and 92 are not interconnected by the shifter idler pinion 110.

The shaft 69 is selectively driven at a lower speed from the shaft 39 by sliding the clutch member 72 to the right so that the gear 71 is clutched for rotation with the sleeve 73. The gear 71 drives the shaft 69 through its meshing engagement with the gear 98.

A still lower relative speed of rotation of the shaft 69 is secured by moving the clutch member 108 to the left into engagement with the teeth 103 formed on the hub of the gear 101. The shaft 69 rotates with the gear 92 which is clutched to the gear 101, this latter gear being driven by the pinion 79, with which it is constantly in mesh.

When the shiftable idler gear is meshed with the pinion 81 and the gear 92 for reversing the direction of rotation of the shaft 69, it will be understood that the clutch member 72 is in the position illustrated by Figure 3 of the drawings. The clutch member 108 which is preferably interconnected with the shifter for the shiftable idler pinion will assume a position to the right of that shown in Figure 3 of the drawings. By interconnecting the shifting mechanism for the clutch member 108 and the shiftable idler gear, possible damage to the transmission is prevented which would result if the idler pinion and the clutch member 108 were independently movable.

The disposition of the power plant above the rear wheels has been described above and the details of the flexible and extensible connection between the transmission 25 and the drive axle will now be described.

Figures 1, 2:
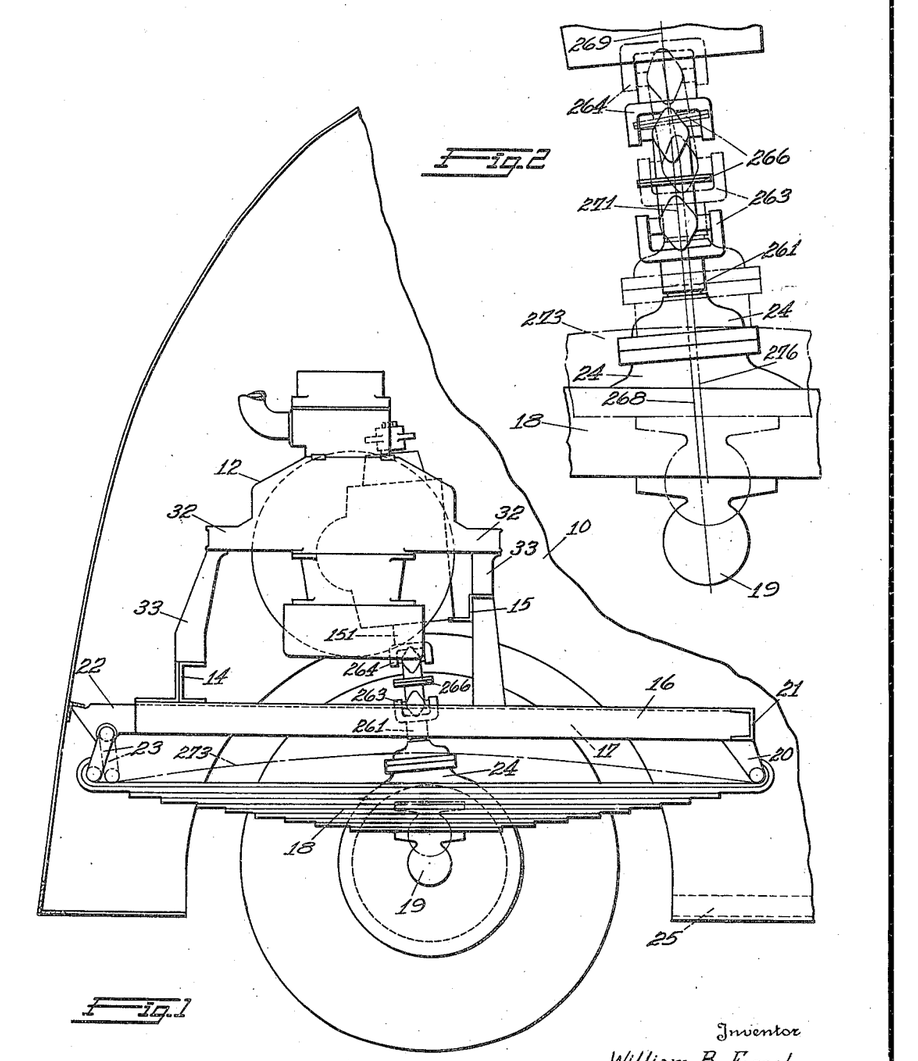
Figure 1 is a fragmentary side elevation of a vehicle embodying the present invention.
Figure 2 is an enlarged view of a part of the mechanism illustrated in Figure 1.

The angular position of the casing 28 with respect to the internal combustion engine 12 is such that the power take-off shaft 151 (Figures 1 and 5) which extends from the side of the casing is substantially vertical or inclined slightly from the vertical as illustrated in Figure 1 of the drawings. The power take-off shaft 151 is driven from a bevel or mitre gear 152 on the counter-shaft of the transmission mechanism 29, the said gear being in mesh with a bevel gear 153. One form of mechanism by which the intermeshed bevel gears may derive power from the engine will be apparent from an inspection of my copending application Serial No. 729,115 which was filed in the Patent Office June 5, 1934. The gear 153 is a part of the novel mechanism to be described in detail, the said mechanism allowing the shaft 151 to move axially as the springs 18 are deflected.

Figure 5:
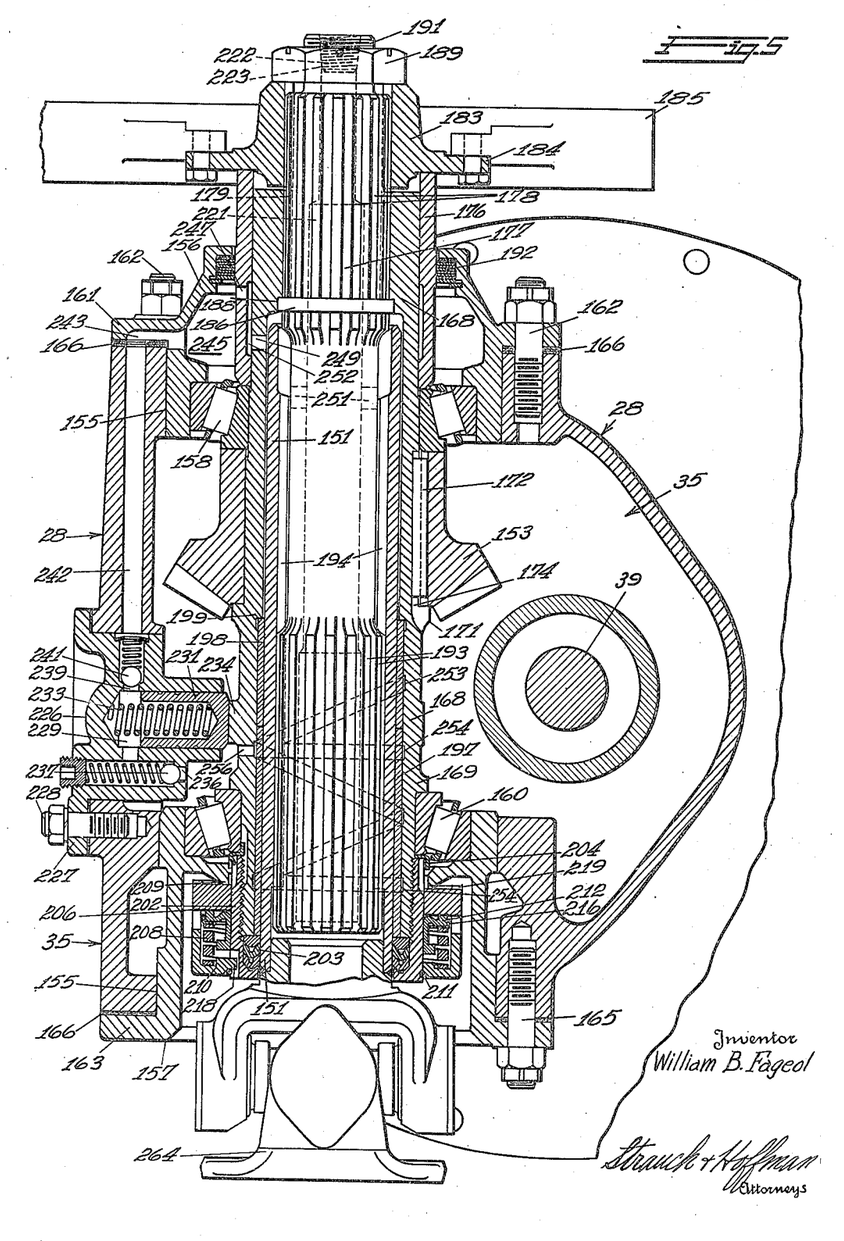
Figure 5 is a vertical sectional view taken on line 5—5 of Figure 3 and illustrates details of the extensible driving connection for the vehicle propeller shaft.

Referring in detail to Figure 5 of the drawings, the section 35 of the housing 28 is provided with co-axial openings 155 at the top and bottom to receive upper and lower bearing carriers or housings 156 and 157 for the combined thrust and anti-friction bearings 158 and 160. The upper bearing carrier 156 has the flange 161 which is apertured to receive a series of studs 162 or other suitable securing devices by means of which the bearing housing is secured within its opening 155. The lower bearing housing 157 is likewise flanged as indicated at 163, the said flange seating against the end of the corresponding aperture 155. The flange 163 is apertured for the purpose of receiving studs 165, by means of which the member 157 is secured in position. Shims 166 are placed beneath the flanges 161 and 163 of the bearing carriers and removal or replacement of these shims provides a ready means for adjusting the bearings 158 and 160. A hollow shaft 168 is shouldered as shown at 169 to provide an abutment for the inner race of the bearing assembly 160 by which it is rotatably supported adjacent one end within the bearing housing 157. A shoulder 171 provides an abutment for the gear 153 which is received on the hollow shaft 168 and is keyed to said shaft by means of a key 172 seated in the keyway 174 and the complemental keyway in the gear. The inner race member of the bearing assembly 158 which is also received over the hollow shaft 168 abuts the upper axial face of the gear 153. A sleeve 176 abuts the inner race member of the bearing assembly 158 and projects upwardly beyond the end of the hollow shaft 168.

A shaft 177 having splines 178 adjacent one end thereof projects within the hollow shaft 168. The splines 178 are engaged with internal splines 179 formed on the interior of the shaft 168 at its end.

Shaft 177 projects beyond the end of the hollow shaft 168 and receives an internally splined member 183. The member 183 is provided with a radial flange 184 which may be connected in any suitable manner to a brake drum or friction disk 185 for cooperation with brake shoes to assist in retarding movement of the vehicle or holding it stationary. A split washer 186 positioned on the splined portion of the shaft 177 seats in a recess 188 in the shaft 168 and provides an abutment whereby the nut 189 on the threaded extension 191 can be used to hold the shaft 177 securely in position and also clamp the member 183 against the axial face of the member 176.

It will be seen from the description given thus far that the gear 153 and the inner race member of the bearing assembly 158 are clamped together axially on the hollow shaft 168 by means of the nut 189. A lubricant seal 192 positioned at the top of the bearing housing 156 prevents escape of lubricant from about the shaft 168.

The shaft 177 is provided with an externally splined portion 193 at its end opposite the splines 178. The shaft 151 is internally splined as indicated by reference character 194 and the shaft 151 is driven by interengagement of the splines 193 and 194 while permitting the shaft 151 to be capable of axial movement within the interior of the hollow shaft 168. Shaft 151 is guided for sliding movement by the bearing sleeves 197 and 198 which may be of the oilless type and which are held in position against a shoulder 199 by a threaded sleeve 202 engaged over the end of the hollow shaft 168. Packing members or wipers 203 carried in a recess at the end of the member 202 prevent escape of lubricant from around the shaft 151 when it is moved axially in response to movements of the vehicle driving axle. The member 202 serves to hold the inner race member of the bearing assembly 160 against the shoulder 169 on the hollow shaft and the member 202 is locked against turning by the locking member 204 which is interposed between the bearing race and the end of the member 202.

Escape of lubricant from the casing 28 about the lower end of the shaft 168 is prevented by a sealing member 206 which is pressed by a spring 208 against a flange 209 on the interior of the member 157. One end of the spring 208 seats in a recess in a cap member 210 secured on one end of the member 202 by a ring 211. The other end of the spring presses upwardly against an annular sealing member 212 which in turn urges the sealing member 206 against the flange 209. The flanged top of the sealing member 212 is provided with a backing 216 against which the spring bears. Rotation of the member 210, and the sealing member 206, is assured by the tongues 218 and 219.

The splined connection comprising the splined portion 194 of the shaft 151 and the spline 193 on the shaft 177 is lubricated by a lubricant introduced into the hollow interior 221 of the shaft 177 upon removal of a threaded filling plug 222 which is threaded into an internally threaded passage 223. A supply of lubricant for the bearing 158 is assured by means of a lubricant pump 226, the body of which is received in an aperture in the side of the casing 28. The body of the pump is provided with a flange 227 which is secured against a boss on the casing 28 by means of studs 228. A cylindrical bore 229 is provided within the body of the pump, a plunger 231 being slidably positioned within the said cylindrical bore 229. A spring 233 urges the plunger 231 outwardly against a cam 234 formed on the hollow shaft 168. The pump intake 236 is closed by a spring pressed ball check valve 237 and the pump discharges through an outlet port 239 which is closed at times by a spring pressed ball check valve 241. The pump discharges lubricant into a passage 242 in the wall of housing 28, which communicates with a passage 243 formed by a recess in the member 156. The passage 243 communicates with the hollow space 245 above the bearing 158.

If desired, a port 247 may be provided in the annular wall of the member 176 which communicates with a port 249 in the shaft 168 by means of a groove 252. The ports 247, 249 and the groove 252 will assure a supply of lubricant to the bearing sleeves 197 and 198 if necessary and the splines 193 and 194 may be lubricated by lubricant flowing from the port 249 and over the top edge of the shaft 151. Surplus lubricant within the bore 221 is drained by means of the port 251. The port 247 which communicates with the hollow space 245 by means of the grooves 252 and the port 249 serves as an air vent and overflow for the interior of the hollow shaft 151. The ports 251 permit lubricant to flow out from the bore 221 and directly onto the splines 193 and 194. A supply of lubricant to the bearing members 197 and 198 is secured by means of a helical channel 253 and circular channels 254. Lubricant is supplied to these channels through a port 256 in the wall of the shaft 168.

As the shaft 168 rotates the high part of the cam 234 forces the pump plunger 231 to the left, forcing lubricant contained within the bore 229 past the ball catch 241 into the passage 242 from which it finds its way to the bearing 158. As the shaft 168 continuously rotates the low portion of the cam 234 comes opposite the plunger 231 and the spring by forcing the plunger out causes lubricant to be drawn into the bore 229 past the ball check 237. This cycle of operation is repeated as the shaft 168 continues to revolve, thereby assuring a supply of lubricant to the bearing 158.

The telescoping driving connection just described is completely sealed against the admission of all road dirt and dust and is thoroughly lubricated in a positive manner.

The power take-off shaft transmits driving power to a propeller shaft 261 (Figure 1) which extends upwardly from the differential mechanism 24 of the rear drive axle 19. The propeller shaft and the power take-off shaft 151 are interconnected through a pair of universal joints 263 and 264, which may be of any approved design. The adjacent yoke members of the universal joints are coupled back to back as indicated by reference character 266 and the joints are associated in such manner that the angular velocity of rotation of the shaft 151 is the same as that of the propeller shaft 261. If desired, a bellows type leather seal may join the drive axle and the transmission completely housing in the universal joints and the sliding tubular drive shaft where it enters the transmission.

The drive axle 19 and the spring 18 are shown in the position occupied with respect to the body framing 10 when the vehicle is loaded to its normal capacity and the position of the universal joint is as illustrated by Figure 1 and by the solid line in Figure 2. It will be noted from Figure 2 that in the normal load position illustrated in Figure 1 the center line 268 of the propeller shaft 261 is substantially in alignment with the center line 269 of the shaft 151, and it will be noted that the line 271 connecting the trunnions of the universal joints is substantially aligned with the center line of the shafts 151 and 261. The dot-dash line 273 on Figure 1 represents the top of the spring when it experiences maximum upward deflection and the position of the shaft and universal joint is illustrated by dot-dash lines on Figure 2. It will be noted that springs 18 are connected to the vehicle frame by means of a fixed pivot 20 and as the springs deflect upwardly they assume the curve designated by the line 273 in Figure 1 and since the axle 19 is underslung beneath the spring 18 the center line 268 moves to a new position 276 which by reason of the location of the axle 19 beneath the spring and the fixed pivotal connection of the spring at 20 and the shackle connection 23 this new position of the center line is substantially parallel to its previous position 268 and the angularity of the line connecting the two universal joints is changed but slightly to compensate for the movement of the axle 19 with respect to the body 10.

The approximate total swing of the line connecting the trunnion centers of the universal joints is approximately only twenty degrees between full braking and full torque condition and this angle is not exceeded even when the shaft 151 is fully extended as when the spring is curved downwardly during rebound.

The operation of the novel driving mechanism is believed to be obvious from the foregoing description, but is briefly as follows:

The change speed transmission mechanism, the clutch and other control functions may be placed under control of the operator located in a convenient position in the vehicle by control means similar to those illustrated and described in either of the above mentioned copending applications. The engine 12 positioned over the rear wheels is controlled from the operator's station by suitable means, for example, those disclosed in my copending application Serial Number 15,085, filed April 6, 1935. The telescoping joint provided by the hollow shaft 168 allows for free movement of the vehicle driving axle with respect to the body 10 as the vehicle encounters irregularities in the surface of the roadway, and the spring arrangement described keeps the center line of the shaft 151 and the propeller shaft 261 practically parallel except when the engine 12 is transmitting maximum torque to the road wheels or when brakes carried by the axle 19 are applied. It is especially to be noted that with the arrangement described in which the shaft 177 projects into the shaft 151 to form the driving connection between the hollow shaft 168 and the shaft 151, all of the side thrust is taken directly by the interior of the hollow shaft 168 thus relieving the shaft 177 of stresses which would otherwise be imposed upon it. The drive shaft 151 and the unusually short propeller shaft, together with the coupling of the universal joints 263 and 264 back to back in the manner described above provides an efficient and compact driving connection between the engine 12 and the vehicle driving wheels. As just stated the shaft 151 is journaled in the hollow engine driven shaft 168 whereby the splined shaft 177 is relieved of stresses due to thrust and serves only to impart driving power to the shaft 151.

Figure 7:
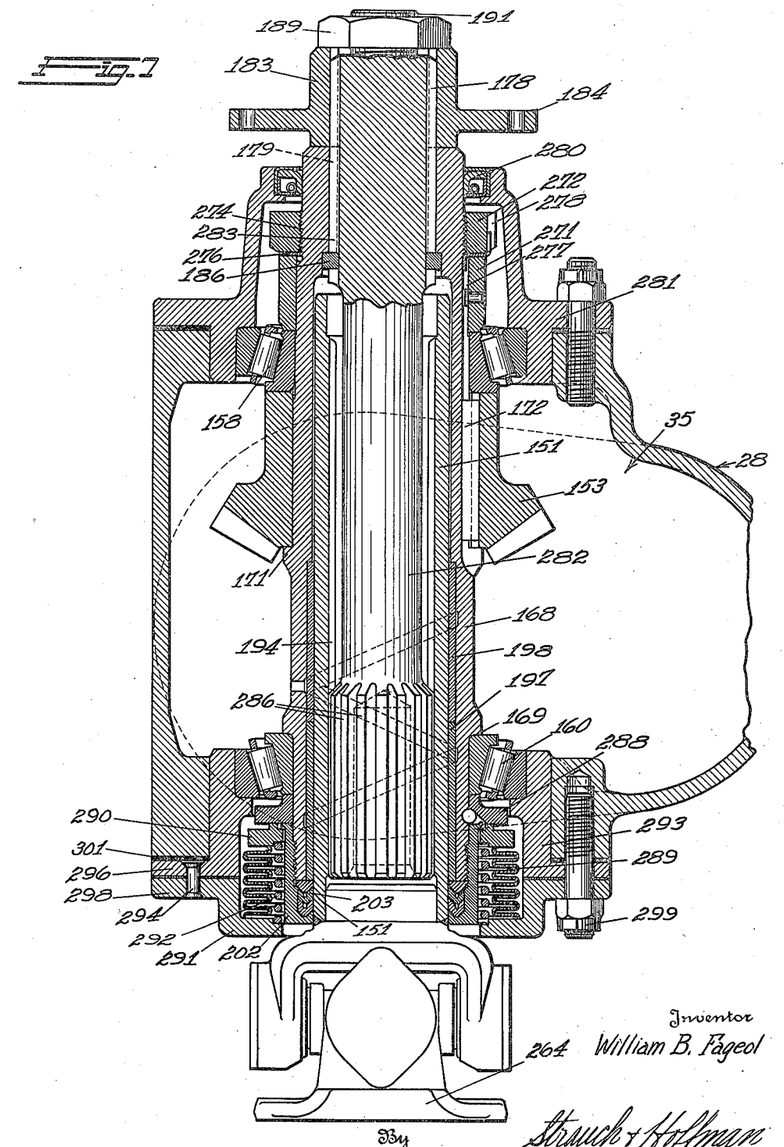
Figure 7 is a view similar to Figure 5 and illustrates a modified form of extensible propeller driving shaft mechanism.

A modified form of extensible driving connection is illustrated on Figure 7 of the drawings in which the parts differing from those of Figure 5 are assigned different reference characters. In the mechanism of Figure 7, the gear 153 abuts the shoulder 171 and is drivingly connected for rotation with the hollow shaft by the key 172. The inner bearing race for the bearing 158 abuts the top of the gear and a sleeve 271 is interposed between the inner race and a locking nut 272 which is threaded onto threads 274 provided for the purpose on the hollow shaft 168 adjacent its end. A locking device comprising a metallic ring 276 has one of its tongues seated in the key way 277 and another tongue is engaged in the seat 278 formed on the nut 272 which effectively secures the nut against rotation.

It will be seen that the gear 153 and the inner race member of the bearing 158 are clamped together axially on the hollow shaft 168 by means of the nut 272. A lubricant seal 280 positioned at the top of the bearing housing 281 prevents escape of lubricant from about the top of the shaft 168.

The shaft 282 which corresponds to shaft 177 of Figure 5 is splined at 283 and these splines are engaged with the internal splines 179 formed on the interior of the shaft 168 at its end. As in Figure 5, the brake carrying member 183 is connected for rotation with the shaft 168 by means of the splines 283. The split washer 186 provides an abutment whereby the nut 189 can be used to hold the shaft 282 securely in position and also clamp the member 183 against the axial face of the hollow shaft 168.

As in Figure 5, the splines 286 which correspond to the splines 193 are engaged with the internal splines 194 to impart driving power to the shaft 151 while permitting the shaft 151 freedom of axial movement within the hollow shaft 168. The bearing sleeves 197 and 198 guide the shaft 151 in the interior of the shaft 168. The bearing sleeves 197 and 198 are retained in position by a threaded sleeve 202 engaged over the end of the hollow shaft 168. The wiping members 203 prevent escape of lubricant from around the shaft 151 when it moves axially in response to movements of the vehicle driving axle. The member 202 positions the inner race member of the bearing 160 against the shoulder 169 through the medium of an annular member 288 which is interposed between the bearing race and the end of the member 202.

Escape of lubricant from the interior of the casing 28 about the lower end of the shaft 168 is prevented by means of a bellows 289 sealed at one end to the cup-shaped member 291 and at its other end to the ring 290 which is pressed by the spring 292 against the ring member 288. The ends of the spring 292 seat in recesses in the cup member 291 and the annular member 290. The cup member 291 is secured to the bearing housing 293 by means of rivets 294 engaged in a series of apertures in the flange 296 of the bearing housing and the flange 298 of the member 291. The assembled bearing housing and the member 291 are secured to the casing 28 by means of studs 299. Shims 301 correspond to shims 166 previously described in connection with Figure 5.

The telescoping driving mechanism of the modification just described is supplied with lubricant from the interior of the housing 28 and is sealed against escape of lubricant and entrance of dirt by the means described.

Figure 8:
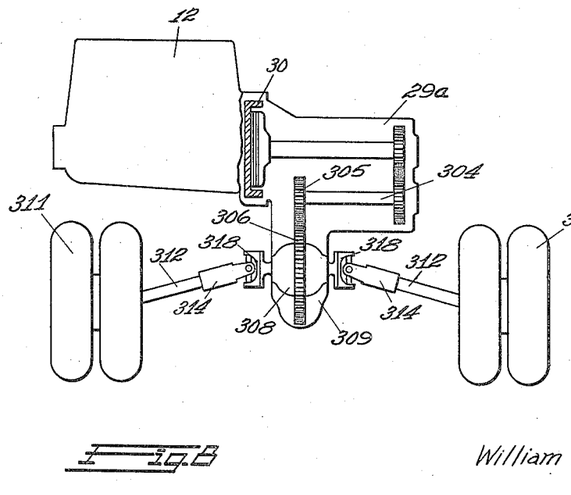
Figure 8 is a diagrammatic view in rear elevation of a modified vehicle drive embodying the present invention.

With the power plant mounted transversely above the rear axle in accordance with the present invention a sprung differential drive may be used wherein the differential mechanism is located within or carried by the casing 28 beneath the transmission mechanism. This modified driving arrangement is illustrated diagrammatically in Figure 8 of the drawings wherein 12 represents the driving engine and 30 the clutch which is interposed between the engine 12 and the change speed transmission mechanism 29a which may be similar in detail to the transmission 29 described above. The counter-shaft 304 of the transmission 29a is provided with a pinion 305 which is in mesh with the differential driving or master gear 306 of the differential mechanism 308 which is supported within the housing 309. The differential mechanism 308 is connected to the driving wheels 311 through drive shafts 312. Slip joints 314 and universal joints 318 are provided in the driving connection to the rear wheels so as to permit relative movement between the wheels and the springs for the differential as the vehicle wheels encounter irregularities in the roadway. It will be understood that if the sprung differential drive of the type just described is used for driving the road wheels 311, an interconnecting dead axle between the wheels may be omitted and the wheels may be spring connected to support the vehicle body by independent spring devices.

Figure 9:
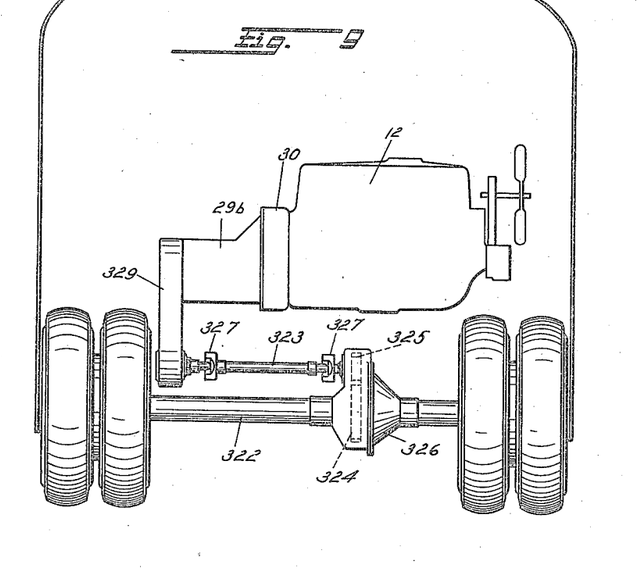
Figures 9 and 10 are rear and side elevational views of another modification of the vehicle drive of the present invention.
Figure 10:
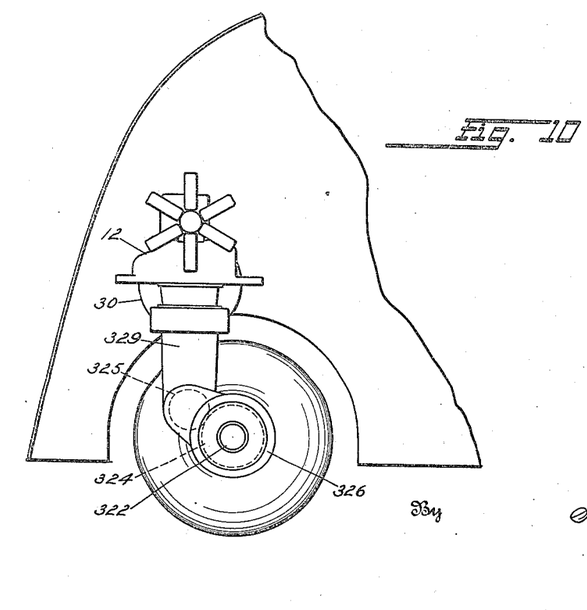

Referring to Figures 9 and 10 of the drawings wherein is shown a modified form of driving arrangement, the road wheels on the differential drive axle 322 are driven from the vehicle power plant through a transversely located propeller shaft 323. The differential driving gear 324 is driven from the propeller shaft 323 by means of a pinion 325 which is rotatably supported in the housing 326 for the differential mechanism. The propeller shaft is provided with universal joints 327 of any approved design. The power plant and transmission mechanism is mounted transversely of the vehicle and above the axle 322 and includes the engine 12 and the change speed transmission mechanism 29b, the latter being of any suitable type or it may be similar to that previously described but modified in certain respects to provide a power output shaft extending transversely of the vehicle. The clutch 30 is interposed between the engine 12 and the transmission 29b. It will be understood that the differential mechanism of the drive axle may be located at or near the vehicle center line rather than to one side thereof as shown.

The transversely located output shaft of the transmission mechanism 29b is operatively connected to the transversely located propeller shaft 323 by means of gearing located within the transfer box or housing 329. The mechanism within the housing 329 may be composed of a train of intermeshing gears or a driving chain engaged over suitable sprockets on the transmission power output shaft and the propeller shaft 323, or it may include a worm or bevel gear driven vertical drive shaft driving the shaft 323 through the worm or bevel gear connection.

It will be seen from the foregoing complete description of my invention that I have provided a novel and compact driving arrangement for a motor vehicle which permits substantially all of the interior space of the vehicle body to be devoted to the carrying of passengers and which transmits power in a novel manner to the driving wheels of the vehicle upon which the vehicle frame is spring supported.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. In a motor vehicle, an axle, road wheels supporting said axle, springs resiliently supporting an end of said vehicle on said axle, said axle comprising drive means serving to drive the vehicle through said road wheels, an elongated assembly of engine and transmission transversely arranged with its axis directly above said axle, and an extensible drive shaft extending substantially vertically between said engine and transmission assembly and said axle to impart power thereto for driving said vehicle.

2. In a motor vehicle, an axle, road wheels supporting said axle, springs resiliently supporting an end of said vehicle on said axle, said axle comprising drive means serving to drive said vehicle through said road wheels, a power plant of unitary design comprising an internal combustion engine, a clutch device, and a transmission mechanism, all aligned and located transversely of said vehicle immediately above said axle, and a flexible and extensible drive shaft extending downwardly from said transmission mechanism to said axle.

3. A unitary power plant and power take-off mechanism for driving a vehicle comprising an internal combustion engine, a housing connected to said engine, a change speed mechanism and a clutch accommodated in said housing, an operative driving connection between said clutch and said transmission mechanism, a power take-off shaft driven from said transmission and journalled in said housing, said shaft being movable axially within said housing whereby to provide for direct connection thereof to the vehicle drive wheels.

4. A road vehicle having a chassis comprising a base frame including longitudinal members terminating at one end adjacent the driving wheels, an engine mounting and suspension structure comprising a pair of transverse frame members designed for support on said longitudinal members and having their ends disposed adjacent the front and rear sides of said driving wheels, and short longitudinal members secured to said transverse members, an engine mounted on said short members directly above the axis of the driving wheels, and suspension springs secured at their ends to said mounting and suspension structure.

5. In a motor vehicle engine mounting and driving arrangement, a drive axle supported by driven wheels, longitudinal springs secured to said axle and having their ends extending forwardly and rearwardly of said axle, a platform comprising framework disposed directly above and in close proximity to the axle and supported on the extending ends of said springs, a motor mounted upon said platform between vertical planes passing through the front and rear ends of the springs, and mechanism connected between the motor and axle to drive the latter, said mechanism embodying a substantially vertical extensible shaft assembly permitting relative vertical movement between the axle and the motor.

6. In a motor vehicle an unsprung axle, and an engine, clutch and transmission mechanism having an elongated sprung housing disposed transversely of said vehicle directly above said axle, and a vertical propeller shaft shiftable vertically within and extending downwardly from said sprung housing for transmitting torque from said transmission to said axle.

7. A motor vehicle including a clutch mechanism, transmission mechanism, and a vertically extensible propeller shaft assembly, said transmission mechanism having a horizontal main shaft operably connected at one end to said clutch, and a horizontal countershaft disposed parallel to and in the same plane with said main shaft and connected thereto by shiftable gearing, said propeller shaft being disposed substantially normal to the horizontal plane of the axes of said transmission shafts and being geared to said countershaft between one end thereof and said clutch mechanism.

8. A motor vehicle including an unsprung axle, and an engine, clutch, and transmission mechanism arranged in substantial alignment parallel to and above said axle in sprung relation thereto, said transmission having a main shaft operably connected at one end to said clutch, the other end of said shaft being geared to a countershaft extending toward said clutch, and a vertically extensible propeller shaft for transmitting torque downwardly from the end of said countershaft adjacent said clutch to said axle.

WILLIAM B. FAGEOL.